United States Patent
Nakajima

(10) Patent No.: US 10,025,218 B2
(45) Date of Patent: Jul. 17, 2018

(54) IMAGE FORMING APPARATUS INCLUDING HIGH VOLTAGE GENERATING CIRCUIT

(71) Applicant: CANON KABUSHIKI KAISHA, Tokyo (JP)

(72) Inventor: Hirohisa Nakajima, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/698,509

(22) Filed: Sep. 7, 2017

(65) Prior Publication Data

US 2018/0074427 A1    Mar. 15, 2018

(30) Foreign Application Priority Data

Sep. 12, 2016 (JP) ................. 2016-177863

(51) Int. Cl.
- *G03G 15/02* (2006.01)
- *G03G 15/06* (2006.01)
- *H04N 1/00* (2006.01)

(52) U.S. Cl.
CPC ..... *G03G 15/0266* (2013.01); *G03G 15/0283* (2013.01); *G03G 15/065* (2013.01); *H04N 1/00899* (2013.01); *H04N 1/00904* (2013.01); *H04N 1/00037* (2013.01); *H04N 1/00076* (2013.01)

(58) Field of Classification Search
CPC .......... H04N 1/00899; H04N 1/00904; G03G 15/0266; G03G 15/0283

USPC .............................. 399/50, 53, 89
See application file for complete search history.

(56) References Cited

U.S. PATENT DOCUMENTS

| 2013/0141751 A1* | 6/2013 | Hata ................. G06F 3/12 358/1.14 |
| 2016/0202643 A1* | 7/2016 | Nakajima ........ G03G 15/1665 399/9 |

FOREIGN PATENT DOCUMENTS

| JP | 2002-333812 A | 11/2002 |
| JP | 2003-208062 A | 7/2003 |
| JP | 2009-122208 A | 6/2009 |
| JP | 2014182156 A * | 9/2014 |

* cited by examiner

*Primary Examiner* — Walter L Lindsay, Jr.
*Assistant Examiner* — Arlene Heredia Ocasio
(74) *Attorney, Agent, or Firm* — Canon U.S.A., Inc. IP Division

(57) ABSTRACT

An image forming apparatus includes: a first power source that supplies a charging voltage to a charger; a second power source that supplies a developing voltage to a developer; a first current detector that detects a current in the charger; a second current detector that detects a current in the developer; an OR circuit to which a first detection signal of the first current detector and a second detection signal of the second current detector are input; and a controller that determines an error related to the first power source or the photoreceptor or an error related to the second power source or the developer on the basis of an output signal of the OR circuit, which is output correspondingly to a level of the first detection signal or a level of the second detection signal.

20 Claims, 8 Drawing Sheets

IMAGE FORMING APPARATUS INCLUDING HIGH VOLTAGE GENERATING CIRCUIT

BACKGROUND OF THE INVENTION

Field of the Invention

The aspect of the embodiments relates to an image forming apparatus including a high voltage generating circuit.

Description of the Related Art

In an image forming apparatus of an electrophotographic system, a high voltage circuit board that supplies a charging voltage to a charging roller and a high voltage circuit board that supplies a developing voltage to a developing sleeve of a developer are provided. A control circuit board connected to the high voltage circuit boards controls the high voltage circuit boards and detects an error related to the high voltage circuit boards. According to an invention described in Japanese Patent Laid-Open No. 2002-333812, a method of detecting a charging error by detecting a value of a current flowing through a charging roller is proposed. According to an invention described in Japanese Patent Laid-Open No. 2009-122208, a detecting circuit that detects an excess current flowing through a developer is also proposed. According to an invention described in Japanese Patent Laid-Open No. 2003-208062, an image forming apparatus that detects a fault of a high voltage circuit board by detecting a current flowing through a drum ground is proposed.

However, according to the inventions described in Japanese Patent Laid-Open No. 2002-333812 and Japanese Patent Laid-Open No. 2009-122208, it is necessary to connect, to a control circuit board, both of a cable with which a detection signal of a charging current is transmitted and a cable with which a detection signal of a developing current is transmitted. This causes an increase in the number of cables between high voltage circuit boards and the control circuit board. According to the invention described in Japanese Patent Laid-Open No. 2003-208062, although one cable is enough for feedback of the current, flowing through the drum ground, to a control circuit board, a circuit for detecting the current of the drum ground is required.

SUMMARY OF THE INVENTION

The aspect of the embodiments provides an image forming apparatus that does not require a circuit for detecting a current of a drum ground and is capable of reducing the number of cables.

A first aspect of the embodiments provides an image forming apparatus, including: a charger that charges a photoreceptor; a developer that develops a latent image formed on the photoreceptor with toner; a first power source that supplies a charging voltage to the charger; a second power source that supplies a developing voltage including a direct current component and an alternating current component to the developer; a first current detector that detects a current flowing through the charger; a second current detector that detects a current which is an alternating current flowing through the developer; an OR circuit to which a first detection signal that indicates a detection result of the first current detector and a second detection signal that indicates a detection result of the second current detector are input and which outputs an output signal corresponding to the first detection signal, in a case where a level of the first detection signal is higher than a level of the second detection signal, and outputs an output signal corresponding to the second detection signal, in a case where the level of the first detection signal is not higher than the level of the second detection signal; and a controller that determines an error related to the first power source or the photoreceptor on a basis of the output signal of the OR circuit in the case where the level of the first detection signal is higher than the level of the second detection signal, and determines an error related to the second power source or the developer on a basis of the output signal of the OR circuit in the case where the level of the first detection signal is not higher than the level of the second detection signal.

Further features of the disclosure will become apparent from the following description of exemplary embodiments with reference to the attached drawings.

DESCRIPTION OF THE EMBODIMENTS

Image Forming Apparatus

Figure 1:
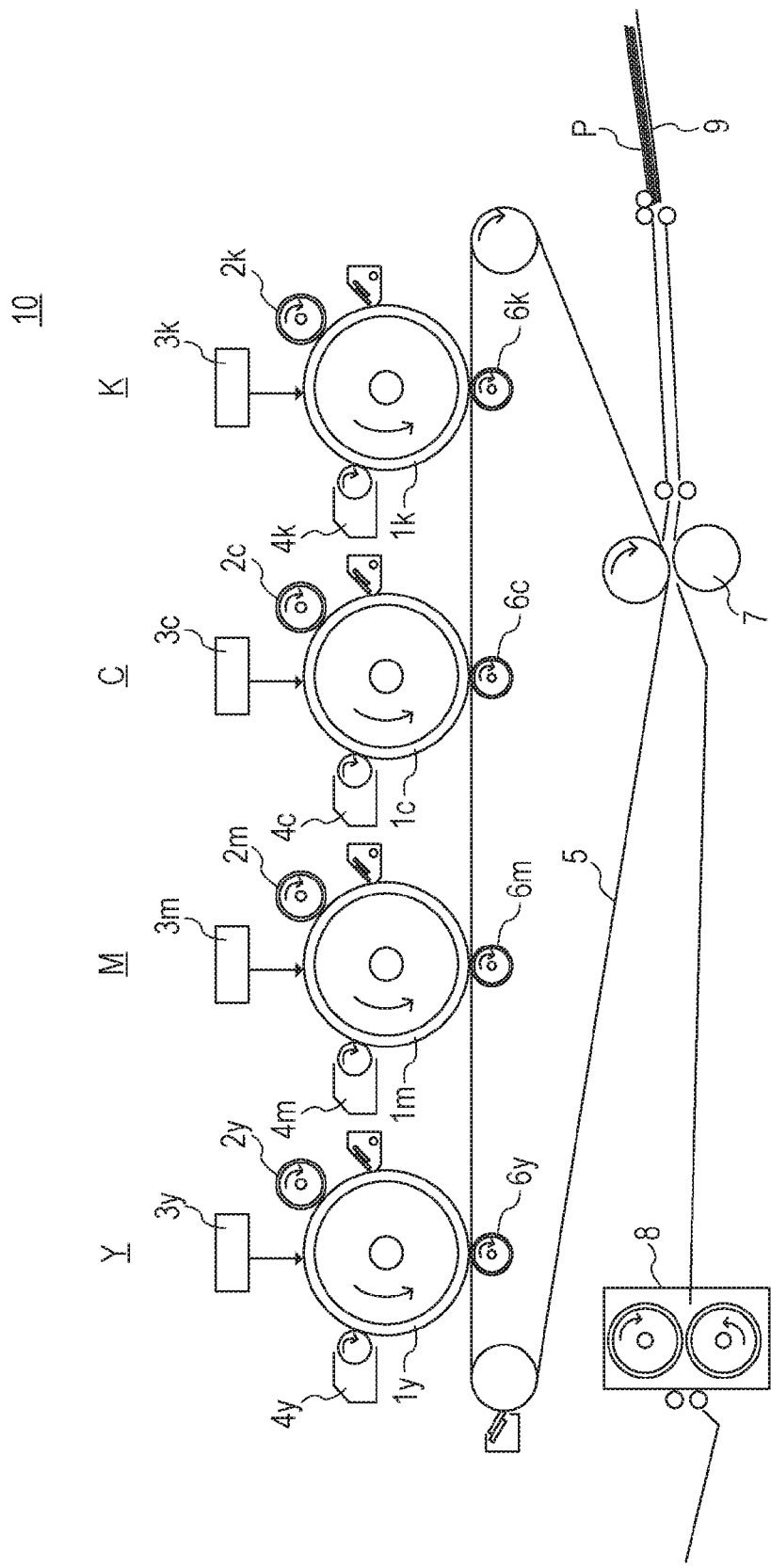
FIG. 1 is a view illustrating a structure of an image forming apparatus.

According to FIG. 1, an image forming apparatus 10 includes four image forming stations by which a multicolor image is formed by superposing toner of four colors of yellow (Y), magenta (M), cyan (C), and black (K). Letters of y, m, c, and k each of which is assigned to an end of a reference sign represent colors of the toner, and the letters of y, m, c, and k are omitted when matters common among the four colors are described. A photoreceptor 1 is a drum-like image carrier which carries an electrostatic latent image and a toner image. A charging roller 2 of a charging device applies a charging voltage to the photoreceptor 1 to uniformly charge a surface of the photoreceptor 1.

The charging voltage is generated by superposing an alternating current voltage on a direct current voltage. An exposing device 3 is a scanning optical device that has a laser light source and a rotating polygonal mirror. The exposing device 3 modulates laser light in accordance with image data and outputs the resultant, and deflects the laser light by the rotating polygonal mirror. Thereby, the surface of the photoreceptor 1 is scanned with the laser light, and an electrostatic latent image corresponding to the image data is formed. In this manner, the exposing device 3 functions as an exposing unit configured to expose the surface of the photoreceptor 1, which has been uniformly charged, for forming the electrostatic latent image. A developer 4 stores toner, and causes the toner to adhere to the electrostatic latent image through a developing sleeve to form a toner image. A primary transfer roller 6 nips, in corporation with the photoreceptor 1, an intermediate transfer belt 5 therebetween, and transfers the toner image carried by the photoreceptor 1 onto the intermediate transfer belt 5. When toner images of the four colors are transferred onto the intermediate transfer belt 5 in order, a multicolor image is formed. The intermediate transfer belt 5 conveys the toner image to a secondary transfer portion. In the secondary transfer portion, a pair of secondary transfer rollers 7 convey the intermediate transfer belt 5 and a sheet P fed from a sheet feeding cassette 9 in a nipping manner. Thereby, the multicolor toner image carried by the intermediate transfer belt 5 is transferred onto the sheet P. A fixing device 8 fixes the toner image onto the sheet P by applying heat and pressure to the sheet P and the toner image.

Control Circuit Board and Power Source Circuit Board

Figure 2:
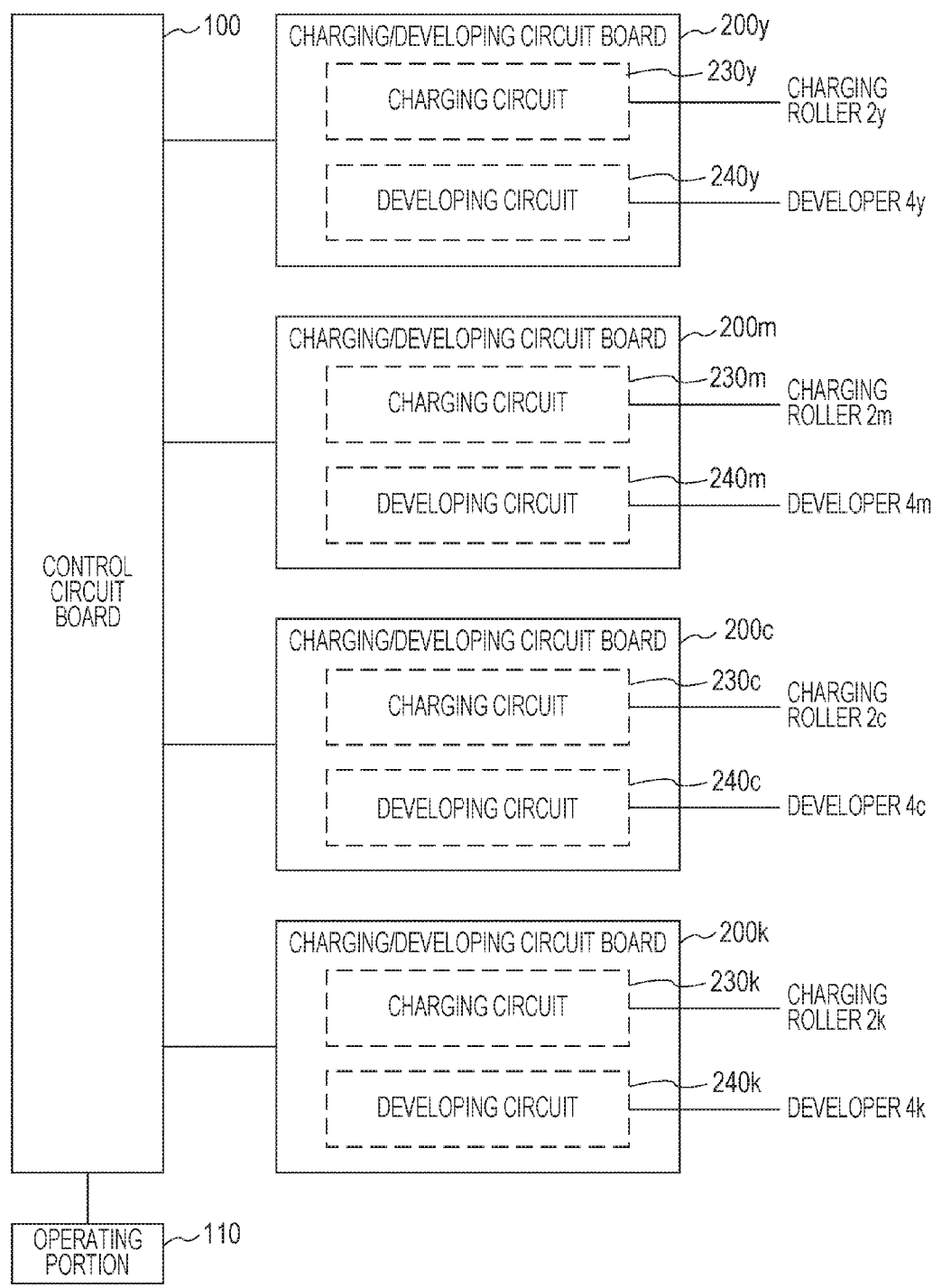
FIG. 2 is a block diagram illustrating a control circuit board and a power source circuit board.

As illustrated in FIG. 2, a charging/developing circuit board 200 is a high voltage power source circuit board that generates a charging voltage and a developing voltage and supplies the charging voltage to the charging roller 2 and the developing voltage to the developer 4. In this example, the charging/developing circuit board 200 is provided in each of the image forming stations of Y, M, C, and K. A deterioration state of the photoreceptor 1 varies with the station, so that the charging voltage and the developing voltage vary with the station. Thus, the charging/developing circuit board 200 is provided in each of the stations. The charging/developing circuit board 200 includes a charging circuit 230 which is a first power source circuit that generates the charging voltage and supplies the charging voltage to the charging roller 2, and a developing circuit 240 which is a second power source circuit that generates the developing voltage including a direct current component and an alternating current component and supplies the developing voltage to the developer 4.

With respect to the charging/developing circuit board 200, a control circuit board 100 executes various types of setting and transmits various commands. The setting includes setting of the charging voltage and the developing voltage. The commands include an output start command of the charging voltage, an output start commend of the direct current component of the developing voltage, an output start command of the alternating current component of the developing voltage, and the like. In addition, the control circuit board 100 also executes error detection related to the charging/developing circuit board 200 and the like. An operating portion 110 includes an input device by which an operator inputs an instruction and an output device by which information is output to the operator. The input device is a touch panel sensor, a switch, or the like. The output device is a sound output device, a display device, or the like.

Details of Charging/Developing Circuit Board

Figure 3:
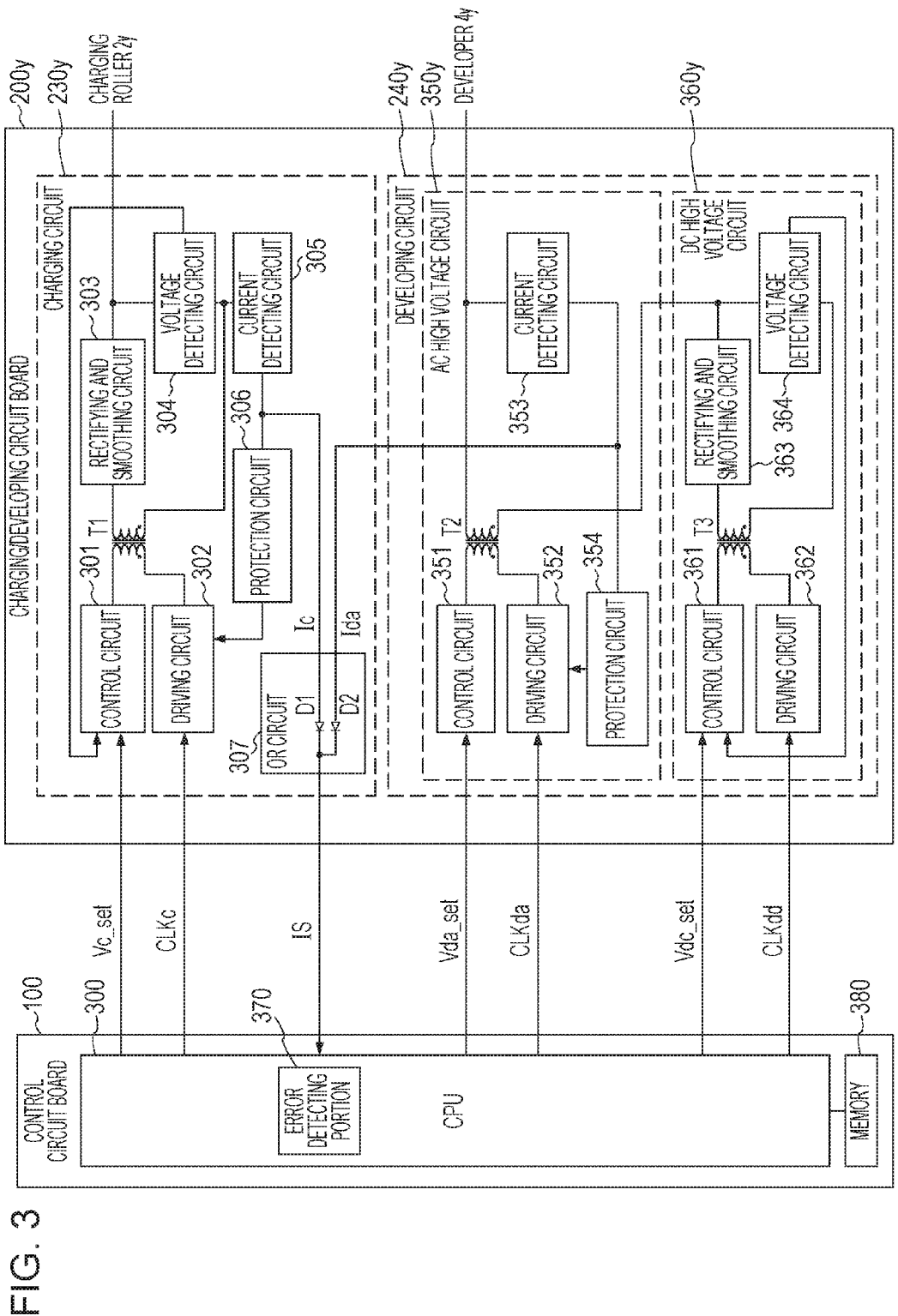
FIG. 3 is a block diagram illustrating a charging/developing circuit board.

FIG. 3 illustrates an example of a circuit configuration of the charging/developing circuit board 200y. A circuit configuration of each of the charging/developing circuit boards 200m, 200c, and 200k is common to the circuit configuration of the charging/developing circuit board 200y, and is therefore omitted to be illustrated. The developing circuit 240y includes a DC high voltage circuit 360y that generates the direct current (DC) component of the developing voltage and an AC high voltage circuit 350y that generates the alternating current (AC) component.

A CPU 300 provided in the control circuit board 100 functions as an error detecting portion 370 by executing a control program stored in a memory 380. On the basis of a detection signal IS output from an OR circuit 307, the error detecting portion 370 detects an error related to the charging circuit 230 or the photoreceptor 1 and an error related to the developing circuit 240 or the developer 4. The memory 380 stores therein threshold data with which whether or not to be an error is determined or the like.

A control circuit 301 provided in the charging circuit 230y controls drive of a transformer T1 so that a charging voltage Vc which is detected by a voltage detecting circuit 304 becomes coincident with a target value which is set by the CPU 300 with a setting signal Vc_set. A driving circuit 302 drives the transformer T1 on the basis of a clock signal CLKc which is input from the control circuit board 100. A rectifying and smoothing circuit 303 is a circuit that rectifies and smooths an alternating current voltage output from a secondary side of the transformer T1 to generate a direct current voltage. The voltage detecting circuit 304 is a circuit that detects the charging voltage Vc and that converts the charging voltage Vc into a voltage of a lower level and feedbacks the resultant to the control circuit 301. A current detecting circuit 305 is a circuit that detects a current (charging current) which flows from the charging circuit 230y to the charging roller 2y and that converts the charging current into a voltage (first detection signal Ic) and outputs the voltage. That is, the first detection signal Ic is a signal indicating a detection value of the charging current. The first detection signal Ic is input to a protection circuit 306 that applies protection to an excess current. Moreover, the first detection signal Ic is input to the CPU 300 of the control circuit board 100 via the OR circuit 307 in order to detect an error of the photoreceptor 1y. The protection circuit 306 is a circuit that, in a case where a level of the first detection signal Ic exceeds a predetermined value, stops the driving circuit 302 and stops generation of the charging voltage Vc. It is thereby possible to protect the charging roller 2y and the photoreceptor 1y from the excess current.

A control circuit 361 provided in the DC high voltage circuit 360y controls drive of a transformer T3 so that a direct current component detected by a voltage detecting circuit 364 becomes coincident with a target value of a direct current component, which is set by the CPU 300 with a setting signal Vdc_set. A driving circuit 362 is a circuit that drives the transformer T3 on the basis of a clock signal CLKdd input from the control circuit board 100. A rectifying and smoothing circuit 363 is a circuit that rectifies and smooths an alternating current voltage output from a secondary side of the transformer T3 to generate a direct current voltage. The voltage detecting circuit 364 is a circuit that converts the direct current component of the developing voltage into a voltage of a lower level and feedbacks the resultant to the control circuit 361.

A control circuit 351 provided in the AC high voltage circuit 350y controls an alternating current component, generated by a transformer T2, in accordance with a target value of the alternating current component, which is set by the CPU 300 with a setting signal Vda_set. A driving circuit 352 is a full-bridge circuit that drives the transformer T2 on the basis of a clock signal CLKda input from the control circuit board 100. A current detecting circuit 353 is a circuit that detects a developing current that is an alternating current flowing through the developer 4y, and a converting circuit that converts the developing current into a voltage (second detection signal Ida) and outputs the voltage. The second detection signal Ida is input to a protection circuit 354 that protects the developer 4y and the photoreceptor 1y from an excess current. Moreover, the second detection signal Ida is input to the CPU 300 of the control circuit board 100 via the OR circuit 307 in order to detect an error of the developer 4y. The protection circuit 354 is a circuit that, in a case where a level of the second detection signal Ida exceeds a predetermined value, stops the driving circuit 352 and stops generation of the alternating current component of the developing voltage. It is thereby possible to protect the developer $4y$ and the photoreceptor $1y$ from the excess current.

The OR circuit 307 is an output circuit that is provided for transmitting the first detection signal Ic and the second detection signal Ida to the CPU 300 with one signal line. The OR circuit 307 includes an input terminal to which the first detection signal Ic is input, an input terminal to which the second detection signal Ida is input, and an output terminal from which an output signal (detection signal IS) is output. The OR circuit 307 is constituted by two diodes, for example. The first detection signal Ic is input to an anode side of a first diode D1. The second detection signal Ida is input to an anode side of a second diode D2. A cathode of the first diode D1 and a cathode of the second diode D2 are connected to the common output terminal. That is, the cathode of the first diode D1 and the cathode of the second diode D2 are connected. Such an OR circuit 307 outputs one of the first detection signal Ic and the second detection signal Ida, which is at a higher level, as the detection signal IS. That is, in a case where the level of the first detection signal Ic is higher than the level of the second detection signal Ida, the detection signal IS means the first detection signal Ic. On the other hand, in a case where the level of the first detection signal Ic is not higher than the level of the second detection signal Ida (in a case where the level of the second detection signal Ida is higher than the level of the first detection signal Ic), the detection signal IS means the second detection signal Ida. In this manner, the OR circuit 307 functions as a signal selecting circuit or a signal switching circuit. Note that, a level of the detection signal IS is lowered by a forward voltage Vf (for example, 0.6 V) of the diode. That is, the detection signal IS at a level obtained by lowering the level of the first detection signal Ic or the second detection signal Ida by Vf is output from the OR circuit 307.

If the diodes of the OR circuit 307 are omitted, a current flows in a direction from the current detecting circuit 305 to the current detecting circuit 353 or in a direction opposite thereto. This disables the CPU 300 from acquiring a correct detection result. Thus, the first diode D1 and the second diode D2 function as circuit elements that prevent a current from flowing between the current detecting circuit 305 and the current detecting circuit 353.

Figure 4:
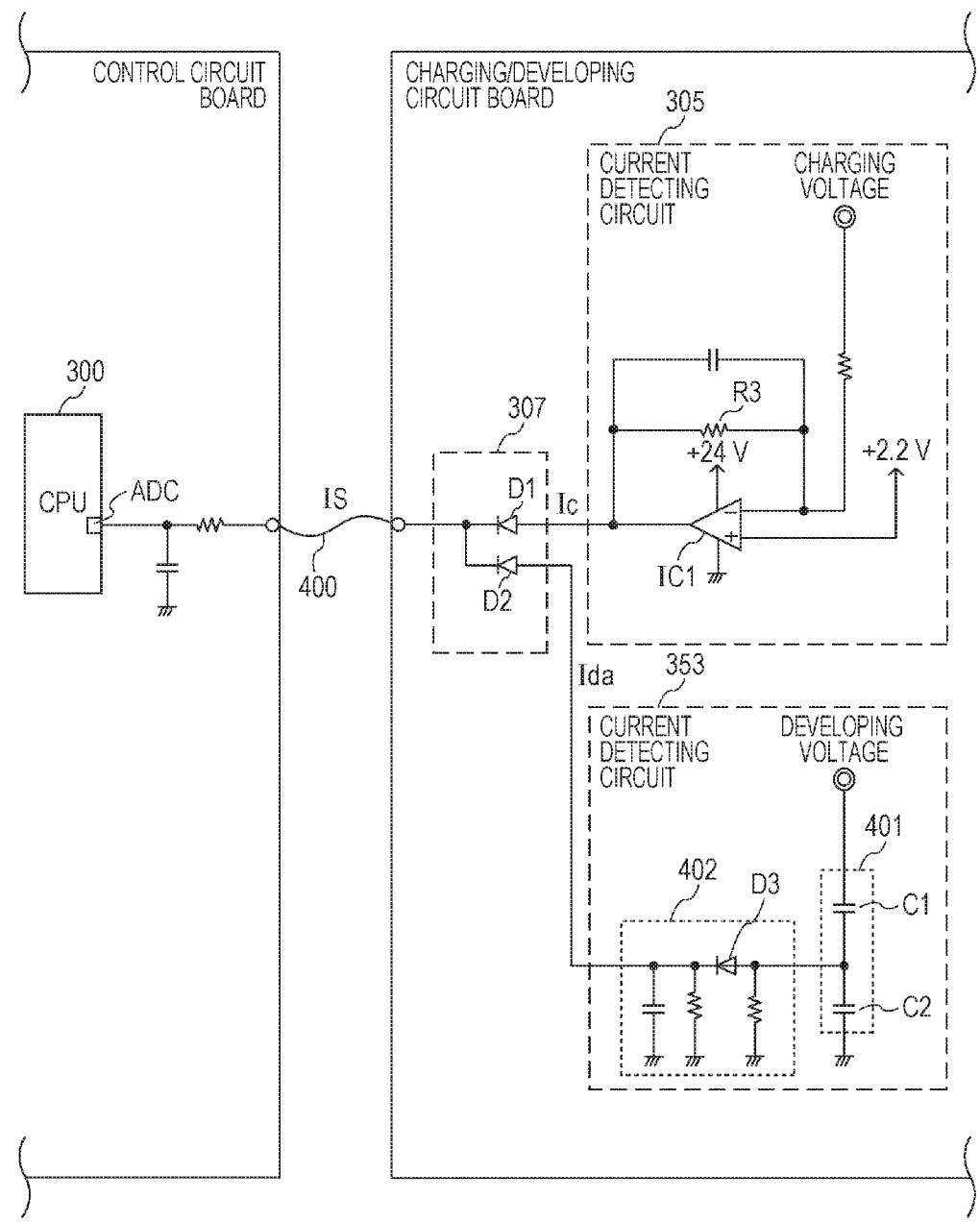
FIG. 4 is a circuit diagram illustrating a current detecting circuit.

FIG. 4 illustrates a circuit configuration of each of the current detecting circuit 305, the current detecting circuit 353, and the OR circuit 307. The current detecting circuit 305 that detects the charging current is a current/voltage converting circuit that is constituted by an operational amplifier IC1, a resistance, a capacitor, and the like. A reference voltage of +2.2 V is input to a + terminal of the operational amplifier IC1. Since an output of the operational amplifier IC1 is fed back to a − terminal of the operational amplifier IC1 via a resistance R3, a potential of the − terminal of the operational amplifier IC1 is +2.2 V. When a negative charging current Ic' is generated, the charging current Ic' flows into an output side of the operational amplifier IC1 from the charging roller $2y$ via the resistance R3 (for example, 10 kΩ). At this time, the level of the first detection signal Ic that is an output voltage of the operational amplifier IC1 is 2.2 V+10 kΩ×Ic'. For example, when the charging current Ic' is 0 μA, the level of the first detection signal Ic is 2.2 V. Moreover, when the charging current Ic' is −100 μA, the level of the first detection signal Ic is 1.2 V. The level of the detection signal IS is a level obtained by further lowering the level of the first detection signal Ic by the forward voltage Vf. Thus, when the charging current Ic' is −100 μA to 0 μA, the level of the detection signal IS falls within a range from 0.6 V to 1.6 V.

The current detecting circuit 353 that detects a developing current Idc' is constituted by a capacitor, a resistance, a diode, and the like. A converting circuit 401 is a current/voltage converting circuit that converts the developing current Idc' into a voltage. The developing current Idc' is converted into a voltage corresponding to an equivalent capacitance (load capacitance) of the developer $4y$, a capacitance of a capacitor C1, and a capacitance of a capacitor C2. The voltage is an alternating current voltage, and is therefore subjected to half-wave rectification by a rectifying circuit 402 including a diode D3 to be converted into a direct current voltage (second detection signal Idc'). For example, when the alternating current component of the developing voltage is 1600 Vp-p and the load capacitance of the developer $4y$, which is viewed from the developing circuit $240y$, is 120 pF, a level of the second detection signal Idc' is about 2.3 V. Moreover, when the load capacitance is 180 pF, the level of the second detection signal Idc' is about 3.7 V. Note that, it is assumed that the capacitance of the capacitor C1 is 3300 pF and the capacitance of the capacitor C2 is 0.0033 uF. The detection signal IS is lowered by the forward voltage Vf (about 0.6 V). Thus, when the load capacitance is 120 pF to 180 pF, the level of the detection signal IS falls within a range from 1.7 V to 3.1 V. In addition, when the alternating current component of the developing voltage is not output, the level of the detection signal IS is 0 V.

The detection signal IS output from the charging/developing circuit board $200y$ is input to an analog port ADC of the CPU 300 on the control circuit board 100. The analog port ADC has a function of converting an analog signal into a digital signal. The analog port ADC of the CPU 300 is able to convert an analog value of, for example, 0 V to +3.4 V into a digital value which is proportional thereto, and converts any analog value exceeding +3.4 V into a digital value of 3.4 V.

Error Detection (Determination)

Figure 5:
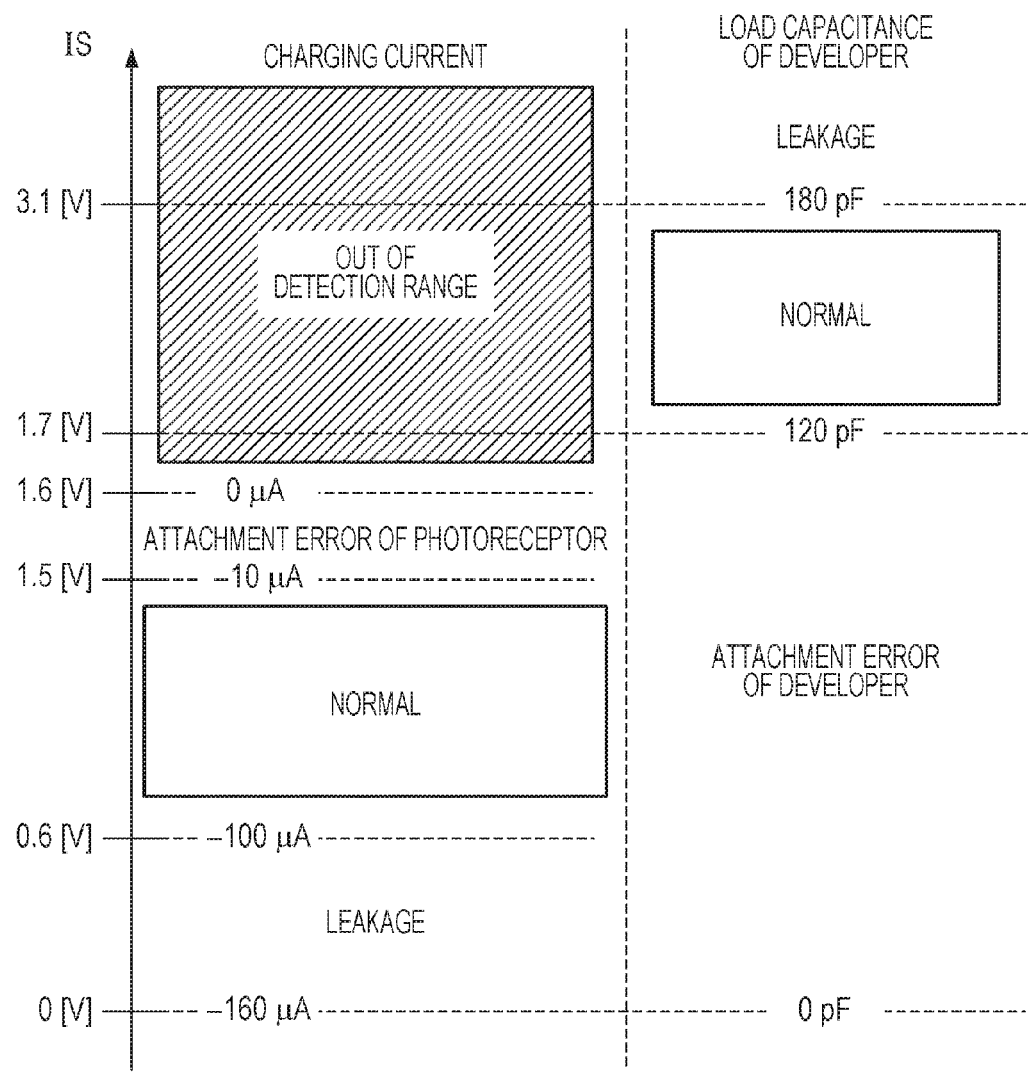
FIG. 5 is a view illustrating a determination criterion of an error.

FIG. 5 illustrates a relation between the detection signal IS, a conversion value of the detection signal IS into the charging current, a conversion value of the detection signal IS into the load capacitance of the developer 4, and an error. Note that, both of the charging voltage and the developing voltage are negative voltages. In a case where the charging current at a time when the charging voltage is output is not less than −100 μA and less than −10 μA, the CPU 300 determines that there is no error (a normal state). In a case where the charging current is less than −100 μA (for example, −130 μA), the CPU 300 determines that leakage of the charging current has been caused. In a case where the charging current is not less than −10 μA and less than 0 μA, the CPU 300 determines that an attachment error of the photoreceptor $1y$ has been caused. When the charging current is converted into the detection signal IS, in a case where the level of the detection signal IS is less than 0.6 V, the CPU 300 determines that leakage of the charging current has been caused. In a case where the level of the detection signal IS is not less than 0.6 V and less than 1.5 V, the CPU 300 determines that the charging current is normal. In a case where the level of the detection signal IS is not less than 1.5 V, the CPU 300 determines that an attachment error of the photoreceptor $1y$ has been caused.

In a case where the load capacitance of the developer $4y$ at a time when the alternating current component of the developing voltage is output is not less than 120 pF and less than 180 pF, the CPU 300 determines that an operation of the developer $4y$ is normal. In a case where the load capacitance is not less than 180 pF, the CPU 300 determines that leakage of the developing current has been caused. In a case where the load capacitance is less than 120 pF, the CPU 300 determines that an attachment error of the developer 4y has been caused. When the load capacitance is converted into the detection signal IS, in a case where the level of the detection signal IS is less than 1.7 V, the CPU 300 determines that an attachment error of the developer 4y has been caused. In a case where the level of the detection signal IS is not less than 1.7 V and less than 3.1 V, the CPU 300 determines that the operation of the developer 4y is normal. In a case where the level of the detection signal IS is not less than 3.1 V, the CPU 300 determines that leakage of the developing current has been caused.

As illustrated in FIG. 5, a possible range of the level of the detection signal IS at a time when the developing current is normal is set to be higher than a possible range of the level of the detection signal IS at a time when the charging current is normal. In other words, a lower limit value of the level of the detection signal IS at the time when the developing current is normal is higher than an upper limit value of the level of the detection signal IS at the time when the charging current is normal. Thereby, in a case where the charging voltage is output and the developing voltage is not output, the level of the detection signal IS indicates a detection result of the charging current. Moreover, in a case where both of the charging voltage and the developing voltage are output, the level of the detection signal IS indicates a detection result of the developing current. However, when output of the developing voltage is started, detection of the charging current based on the detection signal IS becomes impossible. Then, by starting output of the alternating current component of the developing voltage when a predetermined time period elapses after starting output of the charging voltage, the CPU 300 detects both of the charging current and the developing current on the basis of the detection signal IS. That is, the output of the alternating current component is started after measurement of the charging current is completed. Thereby, the CPU 300 determines each of leakage of the charging current, an attachment error of the photoreceptor 1y, leakage of the developing current, and an attachment error of the developer 4y.

Sequence

Figure 6:
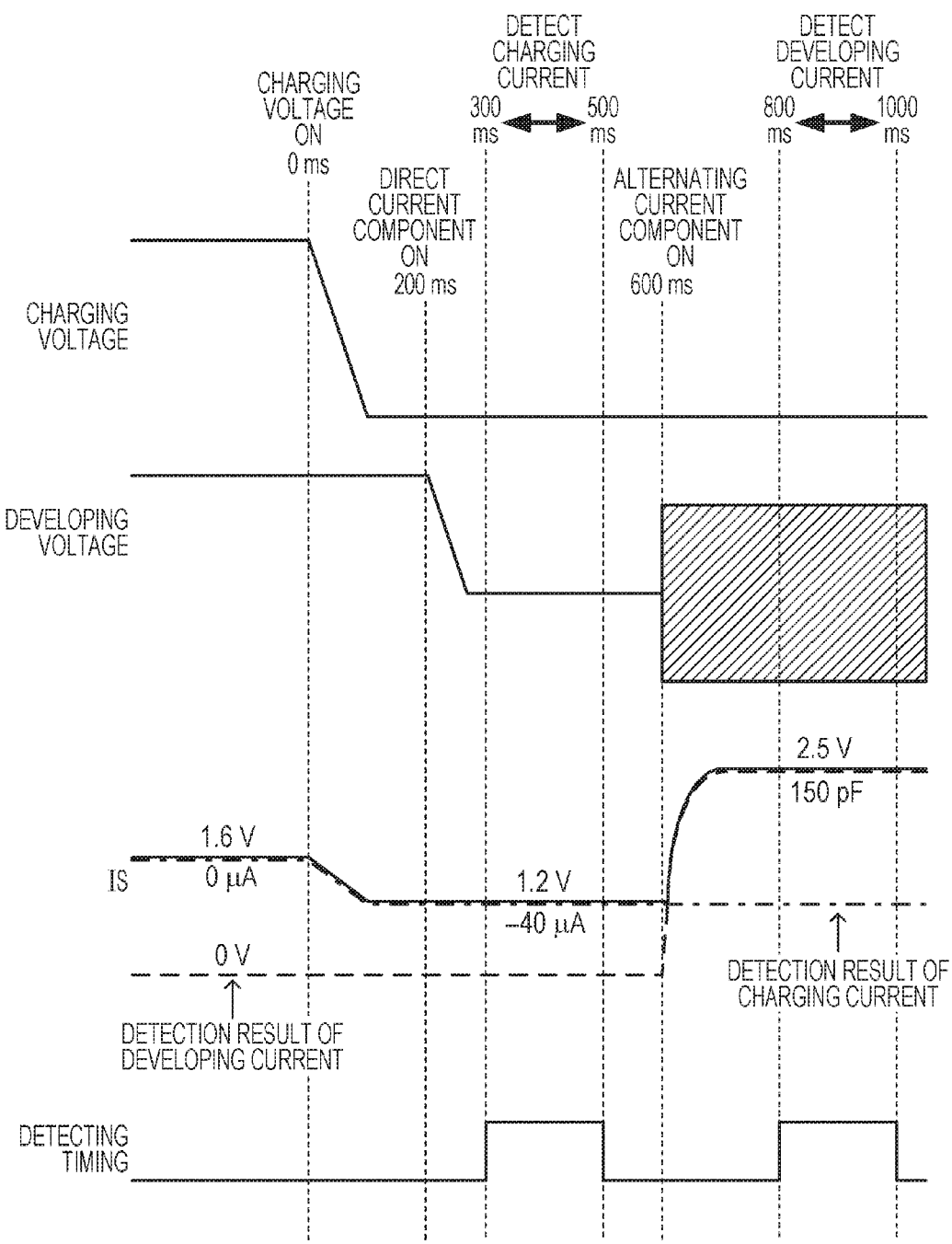
FIG. 6 is a timing chart in a case where there is no error.
Figure 7:
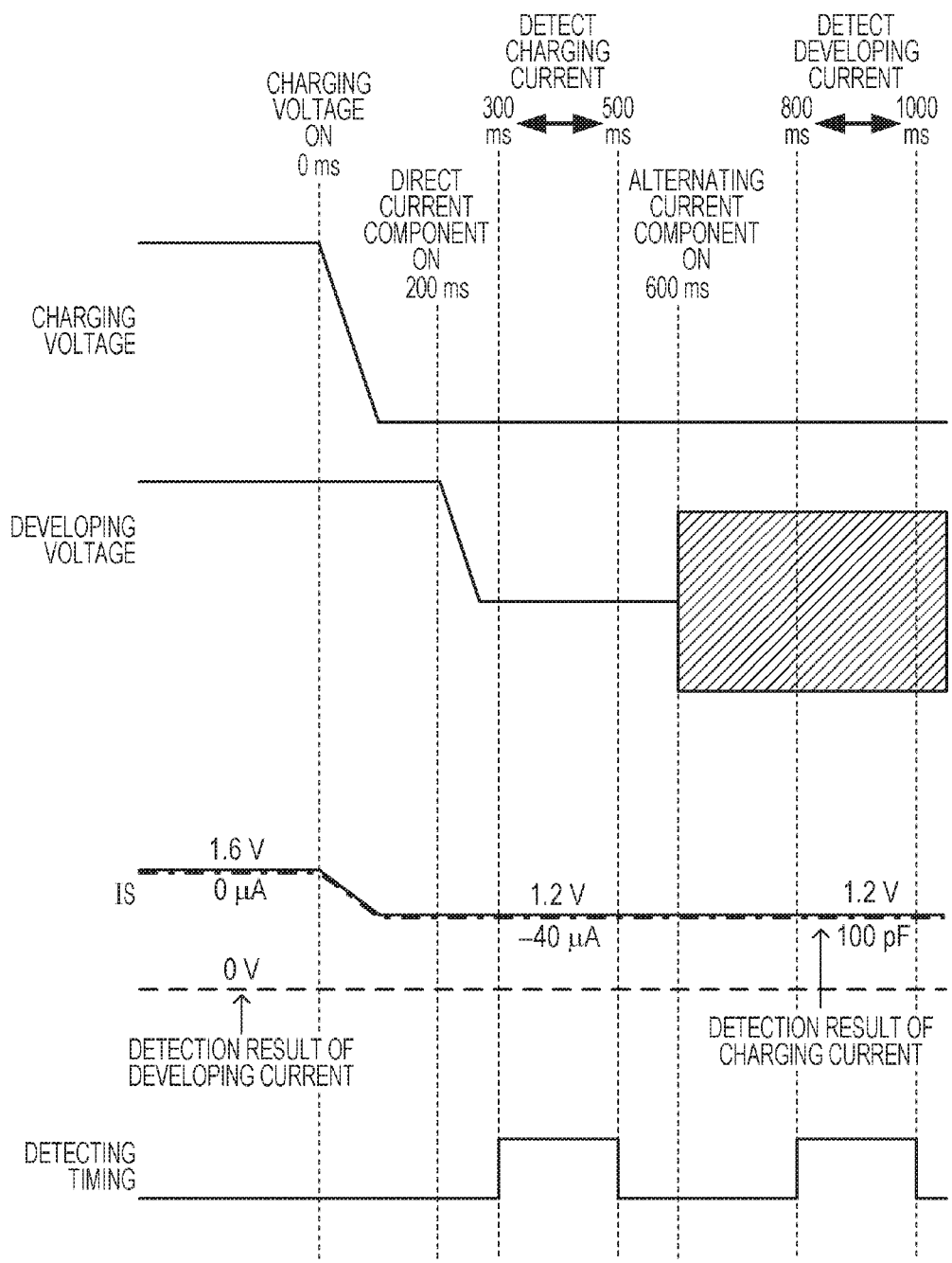
FIG. 7 is a timing chart in a case where there is an error.

FIG. 6 illustrates changes of the charging voltage, the developing voltage, and the detection signal IS, and detecting timings in a normal state. FIG. 7 illustrates changes of the charging voltage, the developing voltage, and the detection signal IS, and detecting timings in a state where the developer 4y is not attached.

The CPU 300 causes the charging circuit 230y to start output of the charging voltage at a first timing (0 ms) (charging voltage ON). Thereby, a detection result (dashed-dotted line) of the charging current falls within a range from 0.6 to 1.5 V as long as the charging current is in a normal range. Since a detection result (dashed line) of the developing current is 0 V, the detection signal IS (solid line) indicates the detection result of the charging current.

The CPU 300 causes the DC high voltage circuit 360y to start generation of the direct current component of the developing voltage at a second timing (200 ms) (direct current component ON). During a period from a third timing (300 ms) to a fourth timing (500 ms), the CPU 300 samples the detection signal IS at intervals of 50 ms. Since the alternating current component of the developing voltage is not output during the period (OFF), the detection result of the charging current (first detection signal Ic)>a detection result of the alternating current component of the developing voltage (second detection signal Ida) is satisfied. Thus, the detection signal IS indicates the detection result of the charging current, and the CPU 300 detects an error related to the charging roller 2y on the basis of the detection signal IS.

Further, the CPU 300 causes the AC high voltage circuit 350y to start generation of the alternating current component of the developing voltage at a fifth timing (600 ms) (alternating current component ON). At this time, when operations of the developer 4y and the like are normal, a predetermined developing current flows. At a timing when a detection result of the developing current (Ida) exceeds the detection result of the charging current (Ic), the detection signal IS indicates the detection result of the developing current.

During a period from a sixth timing (800 ms) to a seventh timing (1000 ms), the CPU 300 samples the detection signal IS at intervals of 50 ms. When the operation of the developer 4y is normal, the detection signal IS becomes, for example, 2.5 V as illustrated in FIG. 6.

On the other hand, in a case where the developer 4y is not attached, even when the developing voltage is output, the developing current does not flow. Accordingly, as illustrated in FIG. 7, during the period in which the developing current is detected, the detection result of the charging current (Ic)>the detection result of the developing current (Idc) is satisfied, and the detection signal IS indicates the detection result of the charging current. At this time, the level of the detection signal IS becomes, for example, 1.2 V, so that the CPU 300 determines that an attachment error of the developer 4y has been caused.

Flowchart

Figure 8:
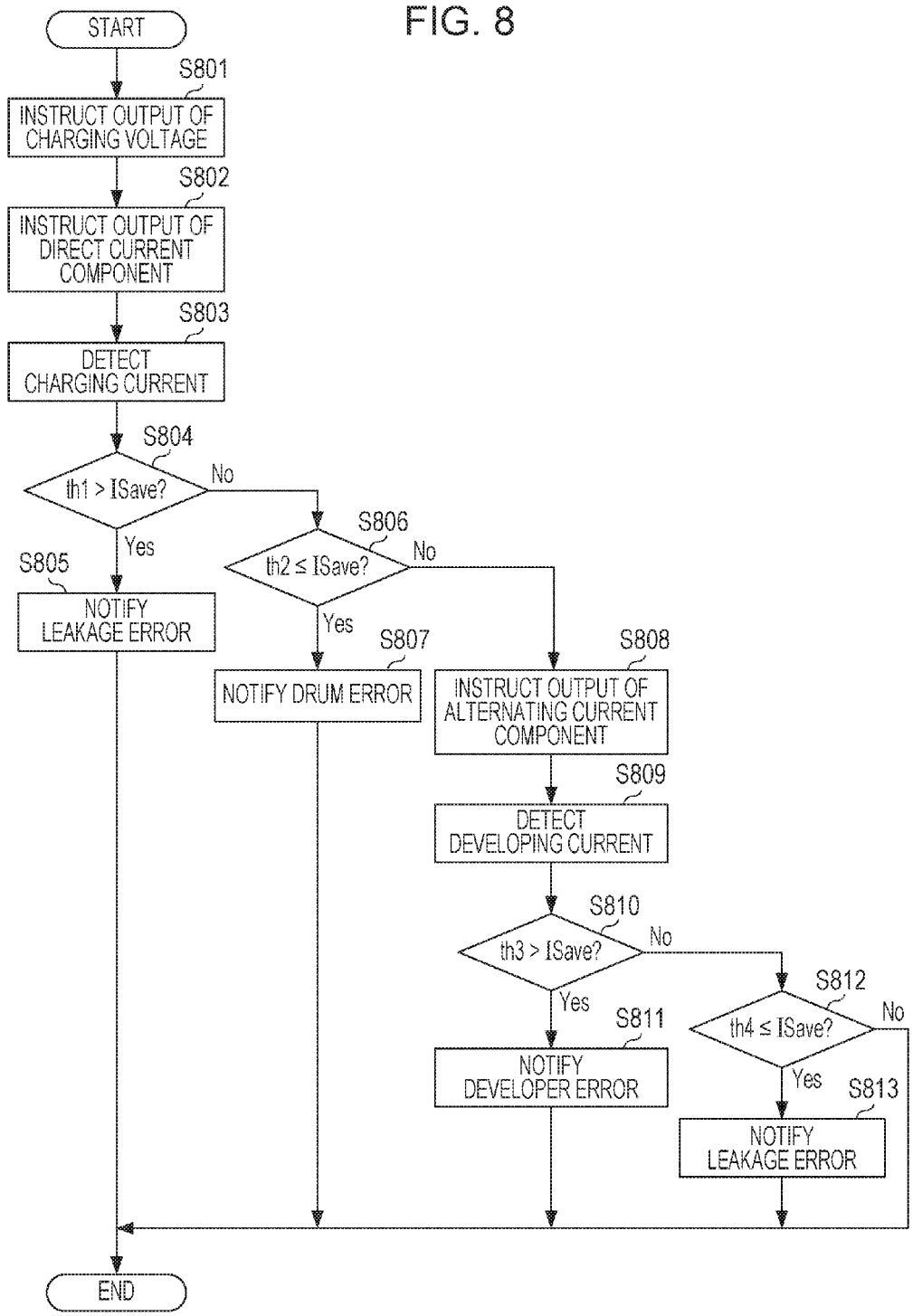
FIG. 8 is a flowchart illustrating error detecting processing.

FIG. 8 is a flowchart illustrating error detecting processing. The error detecting processing is executed by the CPU 300 (error detecting portion 370) in accordance with the control program stored in the memory 380 such as the ROM.

At S801, the CPU 300 instructs the charging circuit 230y to output the charging voltage to thereby cause the charging circuit 230y to start output of the charging voltage. For example, the CPU 300 outputs the setting signal Vc_set with which the target value of the charging voltage Vc is set and outputs the clock signal CLKc with which the transformer T1 is driven. Thereby, the charging circuit 230y starts the output of the charging voltage. Thereafter, the CPU 300 waits for about a predetermined time period (for example, 200 ms), and then moves to S802.

At S802, the CPU 300 instructs the DC high voltage circuit 360y to output the direct current component of the developing voltage to thereby cause the DC high voltage circuit 360y to start output of the direct current component. The CPU 300 outputs, to the DC high voltage circuit 360y, the setting signal Vdc_set with which the target value of the direct current component is set and the clock signal CLKdd with which the transformer T3 is driven. Thereby, the DC high voltage circuit 360y starts the output of the direct current component. Thereafter, the CPU 300 waits for about a predetermined time period (for example, 100 ms), and then moves to S803.

At S803, the CPU 300 detects the charging current on the basis of the detection signal IS output from the OR circuit 307. For example, the CPU 300 samples the detection signal IS four times at intervals of 50 ms to acquire an average value ISave, and moves to S804.

At S804, the CPU 300 determines whether or not the average value ISave of detection results of the charging current is less than a first level th1 (for example, 0.6 V). In a case where the average value ISave is less than the first level th1, the CPU 300 determines that leakage of the charging current has been caused, and moves to S805. As above, the CPU 300 functions as a determination unit of a leakage error of the charging current. The CPU 300 notifies the leakage error at S805. For example, the CPU 300 displays, on the operating portion 110, a message informing that the leakage of the charging current has been caused, and stops image formation. As above, the CPU 300 functions as a notifying unit configured to notify the leakage error of the charging current. On the other hand, in a case where the average value ISave is not less than the first level th1 at S804, the CPU 300 moves to S806.

At S806, the CPU 300 determines whether or not the average value ISave is not less than a second level th2 (for example, 1.5 V). In a case where the average value ISave is not less than the second level th2, the CPU 300 determines that the photoreceptor 1y is not attached, and moves to S807. As above, the CPU 300 functions as a determination unit of a drum error. The CPU 300 notifies the drum error at S807. For example, the CPU 300 displays, on the operating portion 110, a message urging an operator to correctly attach the photoreceptor 1y, and stops the image formation. As above, the CPU 300 functions as a notifying unit configured to notify the drum error. On the other hand, in a case where the average value ISave is less than the second level th2 at S806, the CPU 300 determines that no error related to the charging voltage has been caused, and moves to S808 after a predetermined time period (for example, 100 ms).

At S808, the CPU 300 instructs the AC high voltage circuit 350y to output the alternating current component of the developing voltage. The CPU 300 outputs, to the AC high voltage circuit 350y, the setting signal Vda_set with which the target value of the alternating current component is set and the clock signal CLKda with which the transformer T2 is driven. Thereby, the AC high voltage circuit 350y starts the output of the alternating current component. Thereafter, the CPU 300 waits for about a predetermined time period (for example, 200 ms), and moves to S809.

The CPU 300 detects the developing current on the basis of the detection signal IS t S809. For example, the CPU 300 samples the detection signal IS four times at intervals of 50 ms. Further, the CPU 300 calculates the average value ISave of the four sampling values.

At S810, the CPU 300 determines whether or not the average value ISave is less than a third level th3 (for example, 1.7 V). In a case where the average value ISave is less than the third level th3, the CPU 300 determines that an attachment error of the developer 4y has been caused, and moves to S811. As above, the CPU 300 functions as a determination unit configured to determine a developer error. The CPU 300 notifies the developer error at S811. For example, the CPU 300 outputs, to the operating portion 110, a message urging the operator to correctly attach the developer 4y, and stops the image formation. As above, the CPU 300 functions as a notifying unit configured to notify the developer error. In a case where the average value ISave is not less than the third level th3 at S810, the CPU 300 moves to S812.

At S812, the CPU 300 determines whether or not the average value ISave is not less than a fourth level th4 (for example, 3.1 V). In a case where the average value ISave is not less than the fourth level th4, the CPU 300 determines that leakage of the developing current has been caused, and moves to S813. As above, the CPU 300 functions as a determination unit configured to determine a leakage error of the developing current. The CPU 300 notifies the leakage error of the developing current at S813. For example, the CPU 300 displays, on the operating portion 110, a message informing that the leakage error of the developing current has been caused, and stops the image formation. As above, the CPU 300 functions as a notifying unit configured to notify the leakage error of the developing current. On the other hand, in a case where the average value ISave is less than the fourth level th4, the CPU 300 determines that an error related to the developer 4y has not been caused, either, and continues the image formation.

CONCLUSION

As described by using FIG. 3, the current detecting circuit 305 functions as a first current detector configured to detect the charging current that flows from the charging circuit 230 to the charging roller 2. The current detecting circuit 353 functions as a second current detector configured to detect the developing current that is an alternating current flowing from the developing circuit 240 to the developer 4. The first detection signal Ic indicating the detection result of the current detecting circuit 305 and the second detection signal Ida indicating the detection result of the current detecting circuit 353 are input to the OR circuit 307. In the case where the level of the first detection signal Ic is higher than that of the second detection signal Ida, the OR circuit 307 outputs an output signal (detection signal IS) corresponding to the first detection signal Ic. In the case where the level of the first detection signal Ic is not higher than that of the second detection signal Ida, the OR circuit 307 functions as an output unit configured to output the detection signal IS corresponding to the second detection signal Ida to the CPU 300. The CPU 300 includes the error detecting portion 370. The error detecting portion 370 detects an error related to the charging circuit 230 or the photoreceptor 1 on the basis of the detection signal IS that is output when the level of the first detection signal Ic is higher than that of the second detection signal Ida. Furthermore, the error detecting portion 370 detects an error related to the developing circuit 240 or the developer 4 on the basis of the detection signal IS that is output when the level of the first detection signal Ic is not higher than that of the second detection signal Ida. In this manner, by including the OR circuit 307, it becomes possible to transmit two types of detection signals with a general signal line. Thus, according to the present exemplary embodiment, an error detecting technique that does not require a circuit for detecting a current of a drum ground and is capable of reducing the number of cables is provided. Moreover, it is possible to receive two types of detection signals with one analog port. Thereby, manufacturing costs of the image forming apparatus 10 are to be reduced. Note that, since a circuit that is provided for detecting an excess current is able to be used for each of the current detecting circuit 305 and the current detecting circuit 353, there is no need to add another current detecting circuit.

As illustrated in FIG. 5, when there is no error in both the charging circuit 230 and the photoreceptor 1, the level of the detection signal IS is not less than the first level and less than the second level. That is, the current detecting circuit 305 is configured to generate the first detection signal Ic when there is no error in both the charging circuit 230 and the photoreceptor 1 so that the level of the detection signal IS is not less than the first level and less than the second level. Moreover, as illustrated in FIG. 5, when there is no error in both the developing circuit 240 and the developer 4, the level of the detection signal IS is not less than the third level, which is higher than the second level, and less than the fourth level. That is, the current detecting circuit 353 is configured to generate the second detection signal Ida when there is no error in both the developing circuit 240 and the developer 4 so that the level of the detection signal IS is not less than the third level and less than the fourth level. In the case where the level of the detection signal IS is less than the third level, the error detecting portion 370 determines that an attachment error of the developer 4 has been caused. In the case where the level of the detection signal IS is less than the first level, the error detecting portion 370 determines that leakage of the charging current has been caused. In the case where the level of the detection signal IS is not less than the second level, the error detecting portion 370 determines that an attachment error of the photoreceptor 1 has been caused. In the case where the level of the detection signal IS is not less than the fourth level, the error detecting portion 370 determines that leakage of the developing current has been caused. Thereby, the CPU 300 is enabled to detect four types of errors. Note that, the operating portion 110 functions as a display unit configured to display an error detected by the error detecting portion 370. Thereby, an operator is enabled to visually grasp what type of error has been caused, and able to notify what type of error has been caused to a serviceman at a time of requesting repair. As a result, it is possible to expect reduction in downtime of an apparatus.

As illustrated in FIG. 6, there is a period in which the charging circuit 230 supplies the charging voltage to the charging roller 2 and the developing circuit 240 does not supply the alternating current component of the developing voltage to the developer 4. The error detecting portion 370 detects an error of the charging circuit 230 or the photoreceptor 1 on the basis of the detection signal IS that is output from the OR circuit 307 during the period. Thereby, the detection signal IS of the period indicates presence or absence of the error of the charging circuit 230 or the photoreceptor 1. Moreover, there is a period in which the charging circuit 230 supplies the charging voltage to the charging roller 2 and the developing circuit 240 supplies the alternating current component of the developing voltage to the developer 4. The error detecting portion 370 detects an error of the developing circuit 240 or the developer 4 on the basis of the detection signal IS that is output from the OR circuit 307 during the period. Thereby, the detection signal IS of the period indicates presence or absence of the error of the developing circuit 240 or the developer 4.

The OR circuit 307 is constituted by the first diode D1 and the second diode D2. Since it is possible to constitute an output circuit by such inexpensive circuit elements, manufacturing costs thereof are able to be reduced. The first diode D1 is an example of a circuit element that prevents the first detection signal Ic from flowing into the current detecting circuit 353. The second diode D2 is an example of a circuit element that prevents the second detection signal Ida from flowing into the current detecting circuit 305. Thereby, the CPU 300 is enabled to accurately acquire the detection result of the charging current and the detection result of the developing current.

Although the station of yellow has been mainly described in the above-described exemplary embodiment, the CPU 300 executes similar error detection for each of the stations of the other colors. At this time, the CPU 300 may display, on the operating portion 110, information which enables identifying the station in which an error has been caused. Moreover, there are some cases where, while no error is caused in the station of black, an error is caused in the station of the other color. In such cases, the CPU 300 may display the error on the operating portion 110, and allow formation of a monochrome image of black and prohibit formation of a multicolor image.

Although the charging circuit 230 and the developing circuit 240 are mounted on one circuit board in the aforementioned exemplary embodiment, a plurality of charging circuits 230 and a plurality of developing circuits 240 may be mounted on one circuit board. In this case, the OR circuit 307 is provided for each pair of the charging circuit 230 and the developing circuit 240. Furthermore, the charging circuit 230 and the developing circuit 240 may be separately provided on different circuit boards. The OR circuit 307 is provided for each pair of the charging circuit 230 and the developing circuit 240 also in this case.

According to the present embodiment, an error detecting technique that does not require a circuit for detecting a current of a drum ground and is capable of reducing the number of cables is provided.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-177863 filed Sep. 12, 2016, which is hereby incorporated by reference herein in its entirety.

What is claimed is:

1. An image forming apparatus, comprising:
   a charger that charges a photoreceptor;
   a developer that develops a latent image formed on the photoreceptor with toner;
   a first power source that supplies a charging voltage to the charger;
   a second power source that supplies a developing voltage including a direct current component and an alternating current component to the developer;
   a first detector that detects a current flowing through the charger;
   a second detector that detects a current which is an alternating current flowing through the developer;
   an OR circuit to which a first detection signal that indicates a detection result of the first detector and a second detection signal that indicates a detection result of the second detector are input and which outputs a first output signal corresponding to the first detection signal, in a case where a level of the first detection signal is higher than a level of the second detection signal, and outputs a second output signal corresponding to the second detection signal, in a case where the level of the first detection signal is not higher than the level of the second detection signal; and
   a controller that determines an error related to the first power source or the photoreceptor based on the first output signal, and determines an error related to the second power source or the developer based on the second output signal.

2. The image forming apparatus according to claim 1, wherein
   an output signal of the OR circuit, in a case where there is no error in both the first power source and the photoreceptor, is not less than a first level and less than a second level, and an output signal of the OR circuit, in a case where there is no error in both the second power source and the developer, is not less than a third level, which is higher than the second level, and less than a fourth level.

3. The image forming apparatus according to claim 2, wherein
the first detector generates the first detection signal so that the output signal of the OR circuit, in the case where there is no error in both the first power source and the photoreceptor, is not less than the first level and less than the second level.

4. The image forming apparatus according to claim 2, wherein
the second detector generates the second detection signal so that the output signal of the OR circuit, in the case where there is no error in both the second power source and the developer, is not less than the third level and less than the fourth level.

5. The image forming apparatus according to claim 2, wherein
the controller determines an error related to the first power source or the photoreceptor based on an output signal of the OR circuit in a case where the first power source supplies the charging voltage to the charger and the second power source does not supply the alternating current component of the developing voltage to the developer.

6. The image forming apparatus according to claim 5, wherein
the controller determines that leakage of a current in the charger has been caused, in a case where the output signal of the OR circuit is less than the first level.

7. The image forming apparatus according to claim 5, wherein
the controller determines that an error related to attachment of the photoreceptor has been caused, in a case where the output signal of the OR circuit is not less than the second level.

8. The image forming apparatus according to claim 2, wherein
the controller determines an error related to the second power source or the developer based on an output signal of the OR circuit in a case where the first power source supplies the charging voltage to the charger and the second power source supplies the alternating current component of the developing voltage to the developer.

9. The image forming apparatus according to claim 8, wherein
the controller determines that an error related to attachment of the developer has been caused, in a case where the output signal of the OR circuit is less than the third level.

10. The image forming apparatus according to claim 8, wherein
the controller determines that leakage of a current in the developer has been caused, in a case where the output signal of the OR circuit is not less than the fourth level.

11. The image forming apparatus according to claim 1, wherein
the OR circuit includes a first diode that prevents the first detection signal from flowing into the second detector and a second diode that prevents the second detection signal from flowing into the first detector, and an anode of the first diode is connected to the first detector, an anode of the second diode is connected to the second detector, and a cathode of the first diode and a cathode of the second diode are connected to an output terminal of the OR circuit.

12. The image forming apparatus according to claim 1, further comprising
a display that displays the determined error.

13. An image forming method, comprising:
charging a photoreceptor by a charger;
developing a latent image formed on the photoreceptor with toner by a developer;
supplying a charging voltage to the charger by a first power source;
supplying a developing voltage including a direct current component and an alternating current component to the developer by a second power source;
detecting a current flowing through the charger by a first detector;
detecting an current which is an alternating current flowing through the developer by a second detector;
inputting, to an OR circuit, a first detection signal that indicates a detection result of the first detector and a second detection signal that indicates a detection result of the second detector;
outputting, from the OR circuit, a first output signal corresponding to the first detection signal, in a case where a level of the first detection signal is higher than a level of the second detection signal, and outputting a second output signal corresponding to the second detection signal, in a case where the level of the first detection signal is not higher than the level of the second detection signal; and
determining an error related to the first power source or the photoreceptor based on the first output signal and determining an error related to the second power source or the developer based on the second output signal.

14. The image forming method according to claim 13, wherein
an output signal of the OR circuit, in a case where there is no error in both the first power source and the photoreceptor, is not less than a first level and less than a second level, and an output signal of the OR circuit, in a case where there is no error in both the second power source and the developer, is not less than a third level, which is higher than the second level, and less than a fourth level.

15. The image forming method according to claim 14, wherein
the detecting generates the first detection signal so that the first output signal, in the case where there is no error in both the first power source and the photoreceptor, is not less than the first level and less than the second level.

16. The image forming method according to claim 14, wherein
the detecting generates the second detection signal so that the second output signal, in the case where there is no error in both the second power source and the developer, is not less than the third level and less than the fourth level.

17. The image forming method according to claim 14, wherein
the determining determines an error related to the first power source or the photoreceptor based on an output signal of the OR circuit in a case where the first power source supplies the charging voltage to the charger and the second power source does not supply the alternating current component of the developing voltage to the developer.

18. The image forming method according to claim 14, wherein
the determining determines an error related to the second power source or the developer based on an output signal of the OR circuit in a case where the first power source supplies the charging voltage to the charger and the second power source supplies the alternating current component of the developing voltage to the developer.

19. The image forming method according to claim 13, wherein
the OR circuit includes a first diode that prevents the first detection signal from flowing into the second detector and a second diode that prevents the second detection signal from flowing into the first detector, and an anode of the first diode is connected to the first detector, an anode of the second diode is connected to the second detector, and a cathode of the first diode and a cathode of the second diode are connected to an output terminal of the OR circuit.

20. The image forming method according to claim 13, further comprising displaying the determined error.

* * * * *